(12) United States Patent
Kinuta

(10) Patent No.: US 6,180,279 B1
(45) Date of Patent: Jan. 30, 2001

(54) METHOD OF MANUFACTURING BATTERY EXPLOSION PREVENTION SAFETY DEVICE

(75) Inventor: Seitin Kinuta, Ashikaga (JP)

(73) Assignee: Optnics Precision Co., Ltd., Ashikaga (JP)

( * ) Notice: Under 35 U.S.C. 154(b), the term of this patent shall be extended for 0 days.

(21) Appl. No.: 08/987,609

(22) Filed: Dec. 9, 1997

(30) Foreign Application Priority Data

Dec. 9, 1996 (JP) ................................................. 8-328368

(51) Int. Cl.⁷ ........................................................ H01M 2/12
(52) U.S. Cl. ............................................................... 429/56
(58) Field of Search ........................................ 429/53, 56

(56) References Cited

U.S. PATENT DOCUMENTS 4,803,136 * 2/1989 Bowsky et al. ........................ 429/56
5,279,907 * 1/1994 Paterek et al. ........................ 429/56

FOREIGN PATENT DOCUMENTS

| 59-79965 | 5/1984 | (JP) . |
|---|---|---|
| 5-314959 | * 11/1993 | (JP) . |
| 6-346271 | 12/1994 | (JP) . |
| 8-17416 | 1/1996 | (JP) . |
| 8-183151 | 7/1996 | (JP) . |

* cited by examiner

Primary Examiner—Maria Nuzzolillo
Assistant Examiner—Susy Tsang
(74) Attorney, Agent, or Firm—Oblon, Spivak, McClelland, Maier & Neustadt, P.C.

(57) ABSTRACT

A method of fabricating a battery explosion prevention safety device includes the steps of electroforming a first metal floor layer on a conductive substrate, coating the first metal layer with a photoresist layer, overlaying the photoresist layer with a photomask having windows that define the shape of a safety valve, irradiating the photoresist layer with ultraviolet light, developing the photoresist layer, and removing unexposed portions of the photoresist layer to expose the first metal layer at those portions, electroforming a second metal layer on the first metal layer, removing exposed portions of the photoresist layer, and separating the conductive substrate from the first metal layer. This method is used to fabricate a plurality of connected explosion prevention safety devices, which can then be readily detached one at a time when needed.

5 Claims, 4 Drawing Sheets

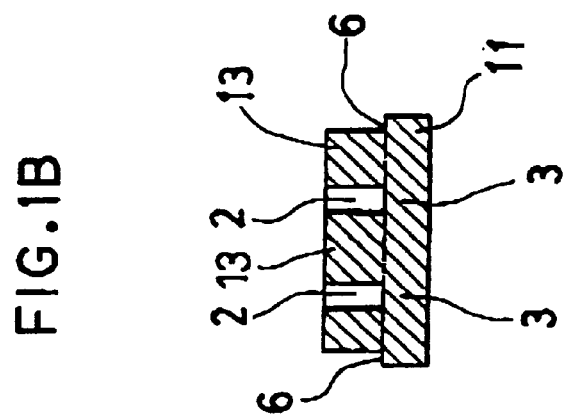
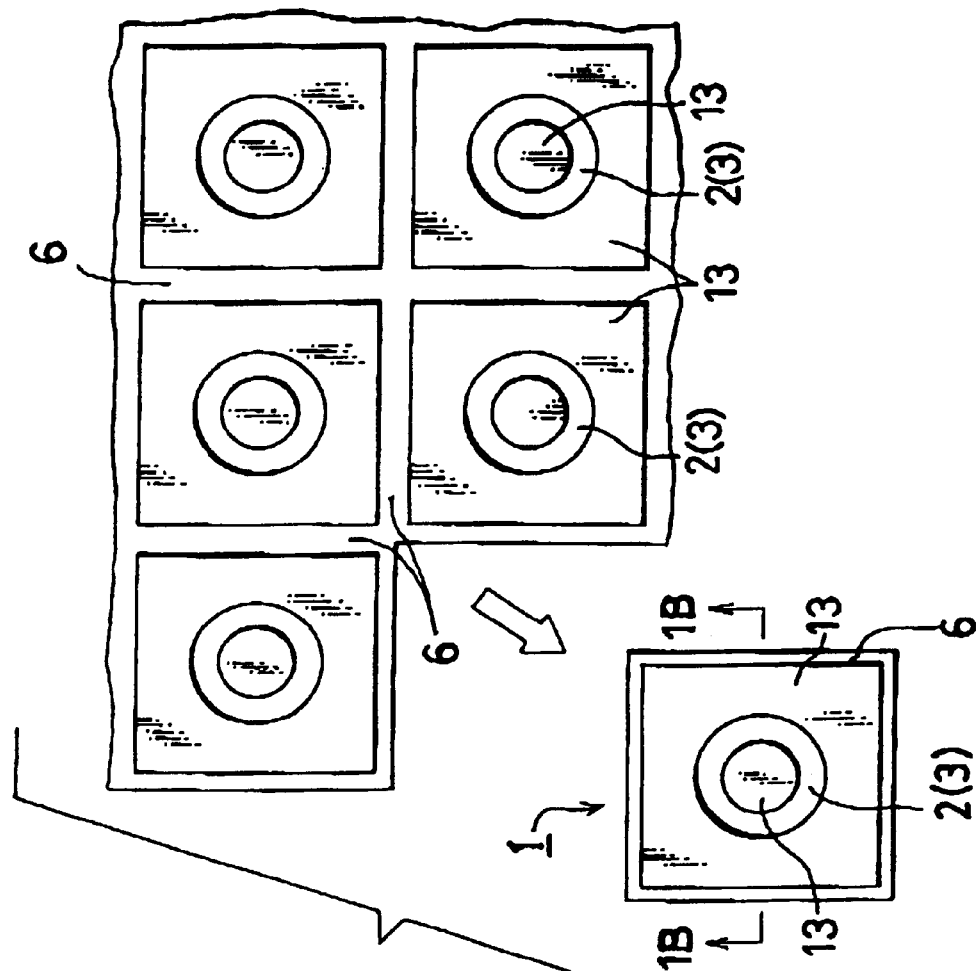

METHOD OF MANUFACTURING BATTERY EXPLOSION PREVENTION SAFETY DEVICE

BACKGROUND OF THE INVENTION

1. Field of the Invention

The present invention relates to a safety device for preventing a battery exploding and a method for manufacturing the safety device, thereby also preventing related damage to surrounding equipment, the safety device being in the form of a thin safety valve welded or otherwise attached to a battery casing to seal a gas vent in the casing so as to allow the release of gas that has risen to a certain pressure in the battery casing, such as a casing of a lithium battery or hydrogen-nickel battery.

2. Discussion of the Background

Explosion prevention safety devices for batteries include those such as the device disclosed by JP-A-59-79965. In that device, the battery cover is in the form of a thin strip of rolled stainless steel 0.4 mm thick having a circular groove 0.2 mm wide with a base 0.2 mm thick formed by pressing, to comprise a safety valve. A rise in internal pressure in the battery causes rupturing along the circular groove, blowing off the safety valve and allowing the gas to be released.

However, based on the rolling specification the rolled stainless steel strip has a tolerance of ±3 to 5 $\mu$m. This means that a groove formed to have a width of 0.2 mm and a floor thickness of 0.02 mm in the strip having a thickness of 0.4 mm±3 to 5 $\mu$m will have a floor thickness of 0.2 mm±3 to 5 $\mu$m, and the pressure at which the safety valve will blow when the thickness of the floor is 0.02 mm+5 $\mu$m will not be the same as the pressure at which the safety valve will blow when the thickness of the floor is 0.02 mm−5 $\mu$m. Moreover, the precision of the thickness produced by pressing will vary slightly depending on the precision of the die and how long it has been in use, the variation being around ±5 to 7 $\mu$m which, when included with respect to the thickness of the groove floor, further increases the variation in internal battery pressure at which the safety valve will blow. Furthermore, the rolled steel material always includes impurities, and if such impurities should form in the floor thickness of the groove, it can weaken that portion to the point where a rise in internal pressure in the battery can result in that portion giving way and allowing the release of the gas, even if the pressure is not high enough to require such release. In extreme cases, such impurities at that portion can form pinholes, resulting in a defective product.

Another arrangement comprises coating the stainless steel strip with a photoresist layer, overlaying the photoresist layer with a photomask that defines the shape of the safety valve groove, exposing and developing the photoresist, removing the unexposed photoresist portion defining the shape of the safety valve groove to expose that portion of the stainless steel strip, etching the exposed portion of the stainless steel strip to reduce the thickness of the floor of the safety valve groove, and then removing the remainder of the photoresist layer from the stainless steel strip. However, the material used is still a rolled stainless steel strip, so there are still the problems of the ±3 to 5 $\mu$m thickness tolerance and the existence of impurities, in addition to which the precision of the thickness of the floor of the groove formed by etching is ±10 $\mu$m, worse than the ±5 to 7 $\mu$m precision of the thickness when the groove is press formed, so that the variation in the internal pressure at which the safety valve blows is even greater than when the groove is press formed.

The basic technical point of the floor of the groove of the safety valve of a battery casing is to prevent an explosion by rupturing when the gas pressure in the casing reaches a set pressure, thereby allowing the gas to escape from the casing. Consequently, the narrower the range of the set pressure, the more reliable the safety device that can be provided. Realizing such a safety device, along with execution by the photolithography method, is an urgent task.

SUMMARY OF THE INVENTION

The object of the present invention is to provide a battery explosion prevention safety device that operates with high reliability when pressure within the battery casing reaches a prescribed pressure, and a method for manufacturing the device.

To attain the above object, the present invention provides a battery explosion prevention safety device comprising a first metal layer electroformed on a conductive substrate that is finally separated from the first metal layer, to have a safety valve, and a second metal layer electroformed on the first metal layer at a portion other than the safety valve, and a method of manufacturing a battery explosion prevention safety device, comprising electroforming on a conductive substrate a first metal layer constituting a floor layer, coating the first metal layer with a photoresist layer, overlaying the photoresist layer with a photomask having a transparent portion defining an outline of a safety valve, irradiating the photoresist layer with ultraviolet light, developing the photoresist layer, and removing unexposed portions of the photoresist layer to expose the first metal layer at those portions, electroforming a second metal layer on the first metal layer, removing exposed portions of the photoresist layer, and separating the conductive substrate from the first metal layer.

In accordance with the arrangement described above, since the first metal layer having a safety valve is electroformed on a substrate, the thickness thereof can be controlled with a precision of 0.1 $\mu$m. Since, moreover, the first metal layer is electroformed, the layer is free of impurities, so there is no formation of highly weakened portions or pinholes.

As a result, in accordance with this invention, a battery explosion prevention safety device can be provided in which the safety valve operates at high reliability when the internal pressure in a battery casing reaches a prescribed pressure.

Further features of the invention, its nature and various advantages will be more apparent from the accompanying drawings and following detailed description of the invention.

BRIEF DESCRIPTION OF THE DRAWINGS

FIG. 1A is an enlarged plan view showing a plurality of contiguously connected explosion prevention safety devices and one separated device, according to the present invention;

FIG. 1B is a cross-sectional view taken along line 1B—1B of FIG. 1A:

DESCRIPTION OF THE PREFERRED EMBODIMENT

Figure 2A:
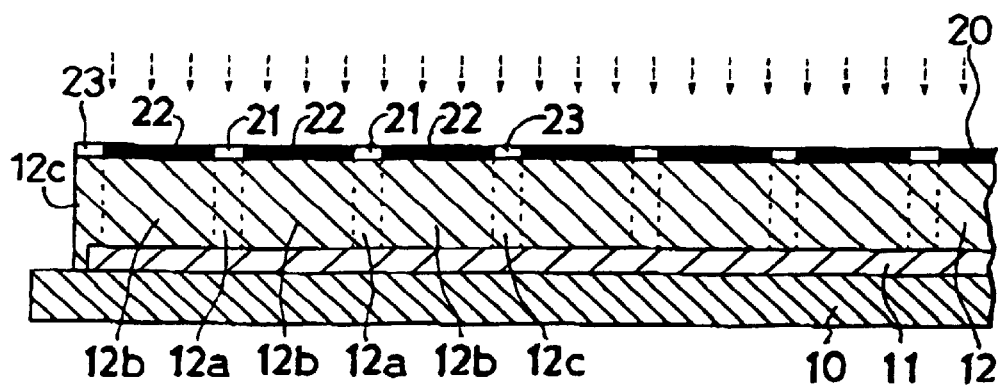
FIG. 2A illustrates ultraviolet light exposure of the photoresist layer on which a photomask has been provided.

FIGS. 1A and 1B are a plan view and cross-sectional view, respectively, of battery explosion prevention safety devices according to the present invention. Each explosion prevention safety device 1 is in the shape of a square measuring, for example, 9.0 mm along each side, electroformed of nickel or nickel alloy 50 μm thick and having in the center a safety valve annular groove 2 that is 0.35 mm wide and has an inside diameter of 2.8 mm and an outside diameter of 3.5 mm. The thickness of the floor 3 of the groove 2 is determined by the internal pressure at which the safety valve is to blow (i.e. be operable). If the groove floor has a thickness of 10 μm, the groove will blow when the pressure in the battery casing reaches 13.4 kg/cm$^2$, producing a hole 3.5 mm in diameter through which the gas in the casing discharges. If the groove floor thickness is 20 μm, the groove will blow when the internal pressure reaches 22.5 kg/cm$^2$, producing a hole 3.5 mm in diameter through which the gas in the casing discharges. Reference numeral 6 denotes the gap between the individual explosion prevention safety devices.

The fabrication of the explosion prevention safety devices 1 will now be described. With reference to FIG. 2, electroforming is used to form a first metal layer 11 of a prescribed thickness on a conductive substrate 10. The thickness of the first metal layer 11 is determined according to the internal pressure at which the safety valve is to blow. The use of electroforming allows the thickness to be controlled with a precision within 0.1 μm. If the first metal layer 11 is to be formed of nickel or nickel alloy, the conductive substrate 10 may be of any metal other than nickel, such as, for example, stainless steel, brass or titanium in order to facilitate its subsequent separation from the first metal layer 11. For the reasons explained below, prior to forming the first metal layer 11 it is desirable to treat the conductive substrate with a separating agent.

Next, the first metal layer 11 is coated with a photosensitive resin to form a photoresist layer 12 on the first metal layer 11. If the explosion prevention safety device 1 is 50 μm thick and the floor 3 of the groove defining the safety valve is 10 μm thick, the thickness of the photoresist layer 12 is 50 μm−10 μm=40 μm. If the floor 3 of the groove defining the safety valve is 20 μm thick, the thickness of the photoresist layer 12 will be 50 μm−20 μm=30 μm.

Figure 3A:
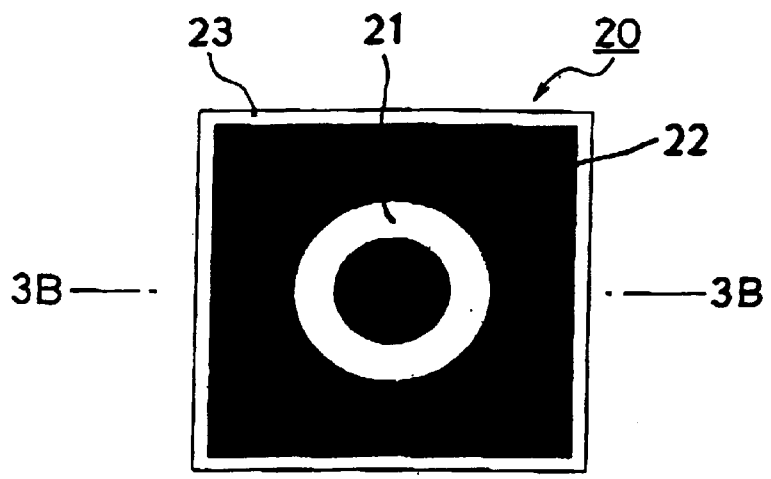
FIG. 3A is an enlarged plan view of the photomask used to manufacture the explosion prevention safety device of FIG. 1.
Figure 3B:
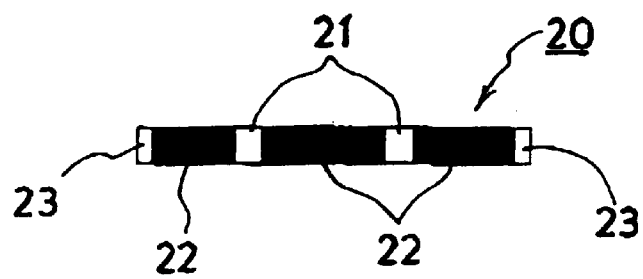
FIG. 3B is a cross-sectional view taken along line 3B—3B of FIG. 3A.

After the photoresist layer 12 has dried, a photomask 20 is superposed on the photoresist layer 12. As shown in FIG. 3, the photomask 20 has a portion 21 corresponding to the line of the safety valve groove 2 that transmits ultraviolet light, and a portion 22 making up the rest of the photomask 20 that does not transmit ultraviolet light. The photoresist layer 12 is then irradiated with ultraviolet light (FIG. 2A), and the photomask is then removed and the photoresist layer developed. The photoresist layer thus developed is negative. When a positive photoresist layer is used, a photomask with its white and black patterns reversed is used.

Figure 2B:
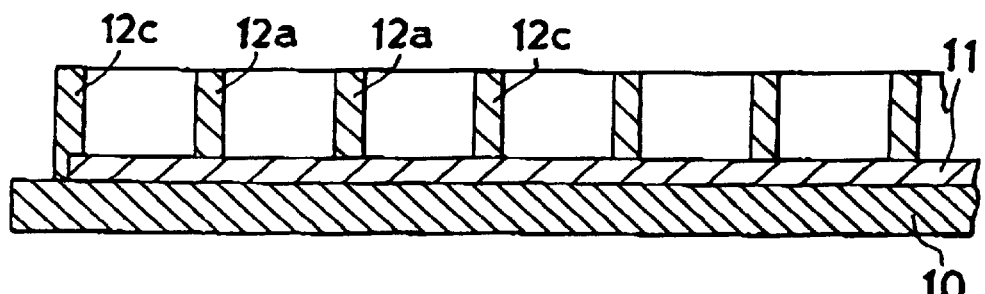
FIG. 2B shows the photoresist layer from which the unexposed portions have been removed.

The development process hardens the safety valve groove portions 12a of the photoresist layer exposed to the ultraviolet light. Photoresist layer portions 12b are the portions that were not exposed to the ultraviolet light. Next, the portions of the first metal layer 11 covered by the unexposed photoresist layer portions 12b are exposed by using alcohol or the like to remove the portions 12b (FIG. 2B).

Figure 2C:
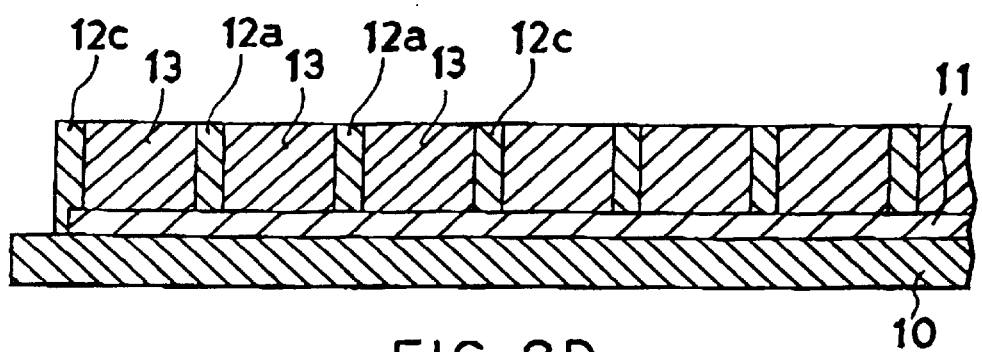
FIG. 2C shows the arrangement following the electroforming of a second metal layer.

Next, with reference to FIG. 2C, a second metal layer 13 is electroformed on the exposed first metal layer 11. The metal of the second metal layer 13 is not necessarily nickel or nickel alloy, but can be any metal other than nickel or nickel alloy. The nickel alloy includes NiPd, NiCo and NiP, for example. Since the safety valve groove 2 portion is covered by a photoresist layer exposed portion 12a that has been hardened by the development process, the second metal layer 13 is formed on the part of the first metal layer 11 from which the unexposed photoresist layer portions 12b were removed, integrally with the first metal layer 11. If the thickness of the explosion prevention safety device 1 is 50 μm and the thickness of the floor 3 of the safety valve groove is 10 μm, a thickness of 40 μm is used for the second metal layer 13, while if the thickness of the groove floor 3 is 20 μm, the thickness of the second metal layer 13 will be 30 μm.

To increase the strength of the bond between the first metal layer 11 and second metal layer 13, prior to electroforming of the second metal layer 13 it is desirable to use a 1:1 solution of hydrochloric acid to sensitize the surface of the first metal layer 11 exposed by the removal of the unexposed portion of the photoresist layer.

Figure 2D:
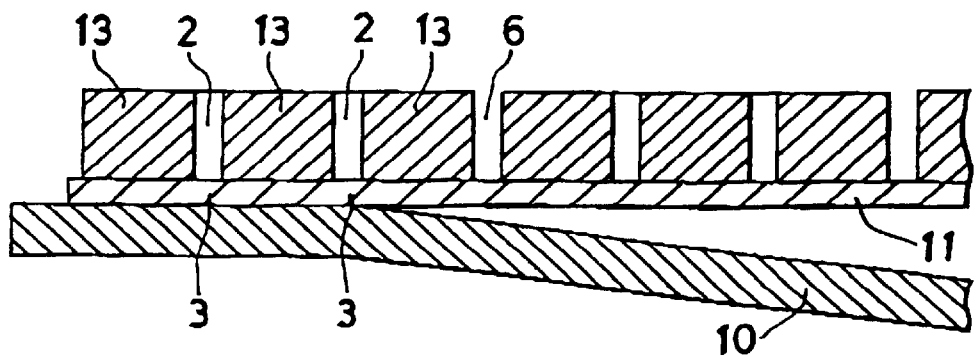
FIG. 2D shows the conductive substrate being separated from the product device after removal of the exposed portions of the photoresist layer.

When the second metal layer 13 has thus been formed to the prescribed thickness, a solvent such as acetone is used to dissolve away the hardened photoresist portions 12a over each safety valve groove 2, and the conductive substrate 10 is peeled off, to thereby obtain an explosion prevention safety device having the desired safety valve (FIG. 2D). Separation of the conductive substrate 10 is facilitated by treating the surface of the conductive substrate 10 with a separating agent prior to forming the first metal layer 11, as mentioned above.

Figure 4A:
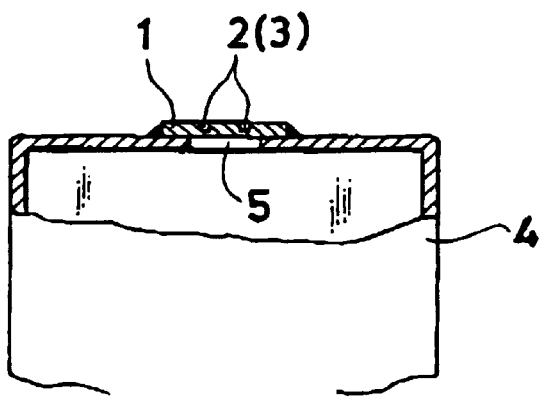
FIG. 4A is a cross-sectional view of the explosion prevention safety device of FIG. 1 attached to a battery casing.
Figure 4B:
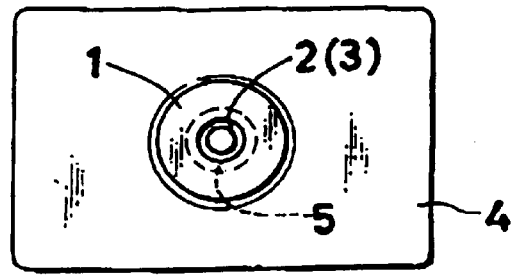
FIG. 4B is a plan view of FIG. 4A.

The explosion prevention safety device 1 can be used to seal a gas vent 5 such as by welding the explosion prevention safety device 1 to the battery casing 4, as shown in FIG. 4. Thus, when the pressure in the battery casing rises to the prescribed level, the safety valve functions by blowing along the floor of the groove which, being thinner, is weakened, releasing the gas in the casing preventing the battery from exploding and thereby also preventing collateral damage to surrounding equipment from such an explosion.

Figure 5A:
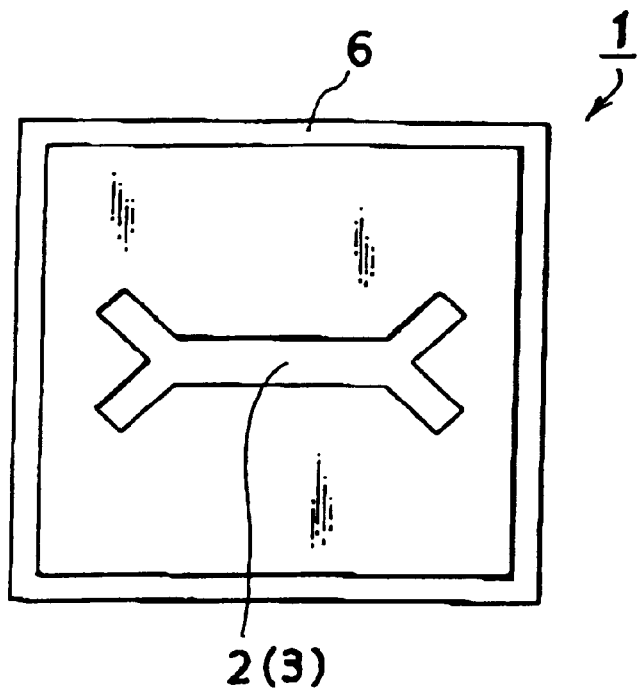
FIG. 5A is a plan view of an explosion prevention safety device with a different safety valve groove configuration.
Figure 5B:
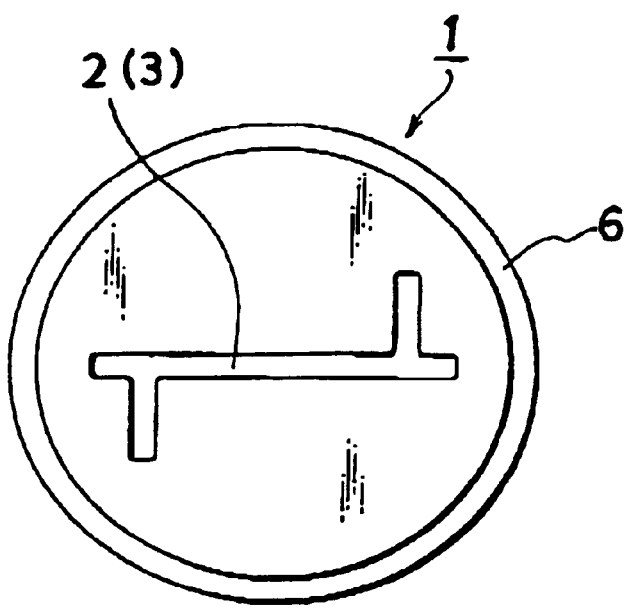
FIG. 5B is a plan view of an explosion prevention safety device with yet another safety valve groove configuration.

The shape of the groove 2 forming the thin floor 3 in the safety valve of explosion prevention safety device is not limited to the circular shape shown in FIG. 1, or to an oval, polygonal or other such closed configuration. Instead, the groove 2 may also have a non-closed configuration such as the shapes shown in FIG. 5.

The explosion prevention safety device of the present invention is small, and is preferably formed as a multiplicity of contiguous devices, as shown in FIG. 1A, with individual devices then being cut off as required. For this, a substrate is used for the conductive substrate 10 that has a large enough area to form multiple devices thereon, and electroforming is used to form the first metal layer 11 over the entire surface of the substrate 10. The photomask 20 provided on the first metal layer 11 is large enough to be superposed over the whole of the first metal layer 11. The photomask 20 is provided with a transparent portion 21 to form the contour of the safety valve groove for one explosion prevention safety device 1, and a transparent portion 23 to form the gap between adjacent explosion prevention safety devices. When a multiplicity of the explosion prevention safety devices has been formed, photoresist layer portions 12c hardened by exposure via the transparent portion 23 is removed and the substrate is separated, leaving adjacent devices connected by just the thin first metal layer 11 having a predetermined thickness, which can therefore be readily cut to detach individual devices.

As described in the foregoing, in accordance with the present invention, the thin floor of the groove that defines the safety valve provided in the explosion prevention safety device is comprised of a first metal layer on the conductive substrate. Since this first metal layer is electroformed on the substrate, the first metal layer is formed uniformly, allowing the floor of the groove to be formed to within ±1 μm of a desired thickness. Moreover, the width of the groove formed by the transparent portion in the photomask does not vary by more than ±2 μm. In addition, because the first metal layer is electroformed, it does not include impurities, so the floor of the groove has no very weak spots or pinholes.

Thus, while in the prior art it has only been possible to fabricate safety valves that function when the pressure in a battery casing rises to 15 kg/cm$^2$±5 kg/cm$^2$, the present invention is able to provide a highly reliable explosion prevention safety device with a safety valve that functions at a pressure of 15 kg/cm$^2$±1 kg/cm$^2$, that is, at a pressure of 14 to 16 kg/cm$^2$.

Obviously, numerous modifications and variations of the present invention are possible in light of the above teachings. It is therefore to be understood that within the scope of the appended claims, the invention may be practiced otherwise than as specifically described herein.

What is claimed is:

1. A method of manufacturing a battery explosion prevention safety device, comprising electroforming on a conductive substrate a first metal layer constituting a floor layer, coating the first metal layer with a photoresist layer, overlaying the photoresist layer with a photomask having a transparent portion defining an outline of a safety valve, irradiating the photoresist layer with ultraviolet light, developing the photoresist layer, and removing unexposed portions of the photoresist layer to expose the first metal layer at those portions, electroforming of a second metal layer on the first metal layer, removing exposed portions of the photoresist layer, and separating the conductive substrate from the first metal layer.

2. The method according to claim 1, further comprising surface treatment of the conductive substrate with a separating agent, prior to electroforming of the first metal layer.

3. The method according to claim 1, further comprising sensitizing a surface of the exposed first metal layer, prior to electroforming of the second metal layer.

4. The method according to claim 1, wherein the conductive substrate and first metal layer are comprised of different metals, and the first metal layer and second metal layer are comprised of a same metal.

5. The method to claim 4, wherein the metal used to form the first metal layer and second metal layer is one selected from the group consisting of nickel and nickel alloy.

* * * * *